United States Patent [19]
Delafosse et al.

[11] 3,954,560
[45] May 4, 1976

[54] NUCLEAR FUEL ASSEMBLY

[75] Inventors: Jacques Delafosse; Jean-Luc Viaud, both of Gif-sur-Yvette, France

[73] Assignee: Commissariat a l'Energie Atomique, Paris, France

[22] Filed: Dec. 11, 1972

[21] Appl. No.: 313,996

Related U.S. Application Data

[63] Continuation of Ser. No. 137,269, April 26, 1971, abandoned.

[30] Foreign Application Priority Data
May 6, 1970 France .............................. 70.16666

[52] U.S. Cl. ................................................. 176/78
[51] Int. Cl.² .......................................... G21C 3/34
[58] Field of Search ............................... 176/76, 78

[56] References Cited
UNITED STATES PATENTS

| | | | |
|---|---|---|---|
| 3,379,619 | 4/1968 | Andrews et al. | 176/78 |
| 3,389,056 | 6/1968 | Frisch | 176/78 |
| 3,431,170 | 3/1969 | Lass et al. | 176/78 |
| 3,607,639 | 9/1971 | Van Santen et al. | 176/78 |
| 3,679,547 | 7/1972 | Warberg | 176/78 |
| 3,713,974 | 1/1973 | Previti et al. | 176/78 |
| 3,719,560 | 3/1973 | Mayers et al. | 176/78 |
| 3,791,466 | 2/1974 | Patterson et al. | 176/78 |

*Primary Examiner*—Harvey E. Behrend
*Attorney, Agent, or Firm*—Cameron, Kerkam, Sutton, Stowell & Stowell

[57] ABSTRACT

A nuclear fuel assembly comprises a cluster of elongated fuel, retained parallel and at the nodal points of a square network by a bottom supporting plate and by spacing grids. The supporting plate is connected to a top end plate via tie-rods which replace fuel pins at certain of the nodal points of the netword. The diameter of the tie-rods is equal to that of the pins and both are slidably received in the grids.

3 Claims, 4 Drawing Figures

NUCLEAR FUEL ASSEMBLY

This is a continuation of application Ser. No. 137,269 filed Apr. 26, 1971 now abandoned.

The invention relates to a nuclear fuel assembly which can be used in a nuclear reactor cooled and moderated with light water (pressurised or boiling) or heavy water, or in a sodium-cooled fast neutron reactor. An assembly of the kind specified comprises a cluster of elongated fuel pins, retained parallel and at the nodal points of a regular network by at least one end plate which bears the pins and by spacing grids which rub against the pins. The term "fuel" must be taken to mean not only fissile material (the general case) but also fertile material.

In such fuel assemblies, grids must be retained laterally and the bottom plate, which as a rule supports the canned slugs must be suspended. In the assembly disclosed in French Pat. No. 1,584,335 this result was achieved by substituting for some of the canned slugs tubular tie-rods attached to the bottom plate, the grids and the top plate supporting the cluster of slugs.

Although this arrangement is satisfactory on the whole, it has one disadvantage, namely that it forces the grids to move in relation to the assembly of canned slugs when thermal conditions vary, more particularly when the reactor starts operating after being stopped. The reason is that if the temperature of the tie-rods is the same as that of the canned slugs when the reactor is stopped, during operation under power the temperature of the tie-rods (in practice equal to that of the coolant) is clearly lower than that of the sheaths through which the heat flow originating from the fuel passes.

It is an object of the invention to obviate this disadvantage; to this end the invention provides a nuclear fuel assembly comprising a bunch of slugs of canned fuel, retained parallel and at the nodal points of a regular network by a bottom end plate which bears the canned slugs, and by spacing grids which rub against the slugs, the plate being connected to a top end plate via tie-rods, the bottom or top plate having means for attachment in the reactor core, and the tie-rods occupying certain of the nodal points of the network, where they take the place of the canned slugs, the diameter of the tie-rods being equal to that of the canned slugs.

Since the number of canned slugs is much higher than the number of tie-rods (as a rule at least about 10 times as great) the frictional forces exerted by the grids on the slugs are much greater than those exerted on the assembly of tie-rods. As a result, such forces retain the grids on the slugs, while the tie-rods slide slightly when thermal conditions change. However, movements of low amplitude can take place between the grids and some of the canned slugs, in view of the differences in expansion which may occur amongst the slugs. To prevent the grids from creeping along the bunch of slugs, advantageously the movement of the grids is limited by stops which leave between the hottest slug and the tie-rods a clearance at least equal to the total differential elongation during operation.

Clearly, the stops can be of various kinds. More particularly they can be formed by strut-like sliding tubes borne by at least some of the tie-rods and separating the grids and also the or each end plate. The stops can also be formed by bosses drawn in the tubular tie-rods after assembly, or members added by welding or glazing or attached by any suitable means to the tubular tie-rods after the assembly thereof.

The invention will be more clearly understood from the following description of a fuel assembly for a pressurised light water nuclear reactor, the assembly forming an exemplary embodiment of the invention. The description refers to the accompanying drawings, wherein.

Figure 1A:
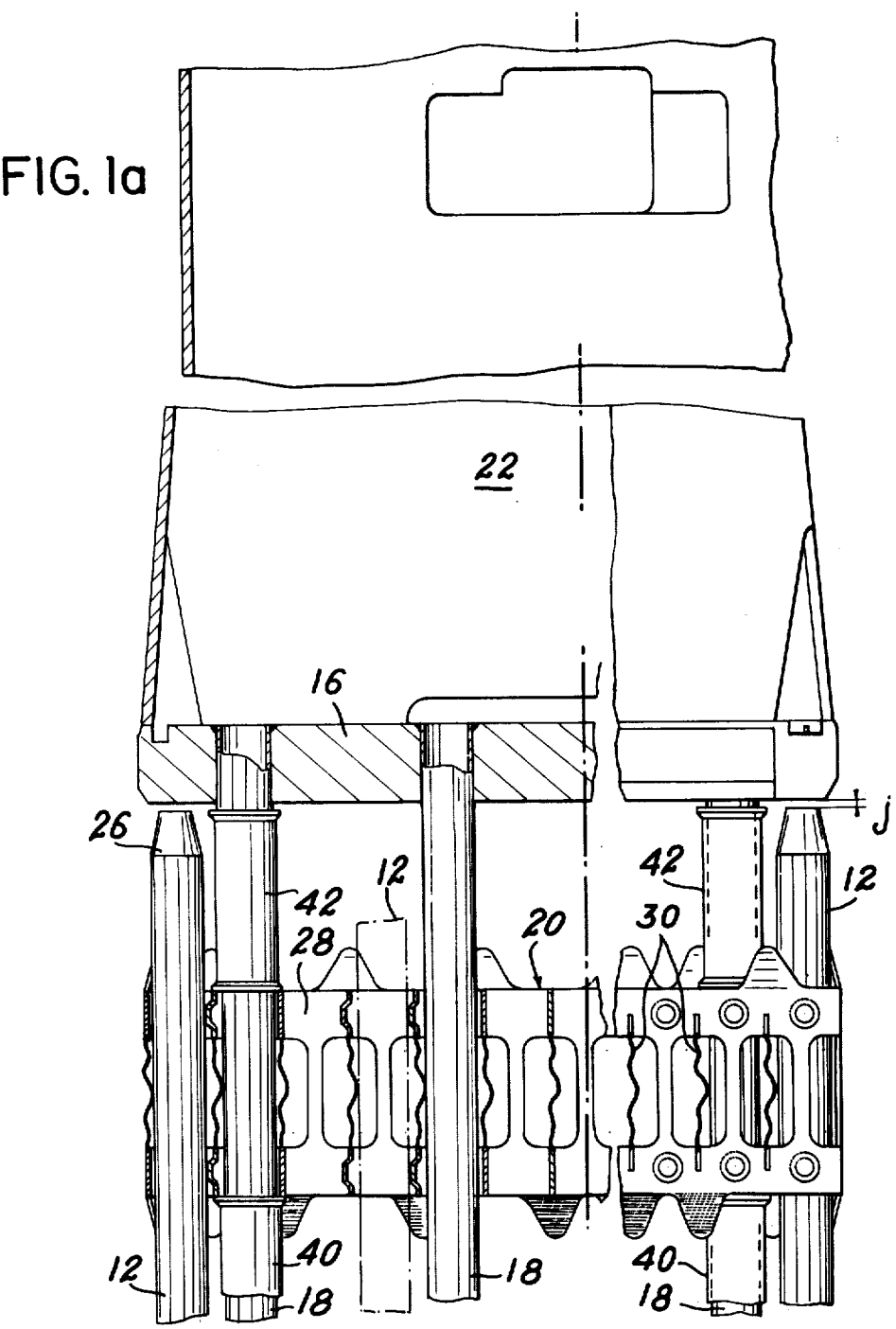
FIGS. 1a and 1b show diagrammatically the upper part of the assembly and a portion of the lower and central parts thereof respectively, in section taken along the line I—I in FIG. 2.

A fuel assembly 10 comprises a bunch of canned slugs 12 which is borne by a bottom plate 14 suspended via tubular tie-rods 18 from a top plate 16. Three grids 20 distributed along the assembly retain the canned slugs 12 at the nodal points of a square network. The top plate 16 is continued by a hood 22 for guiding the coolant (light water) and attaching the assembly to a supporting grid (not shown).

Figure 1B:
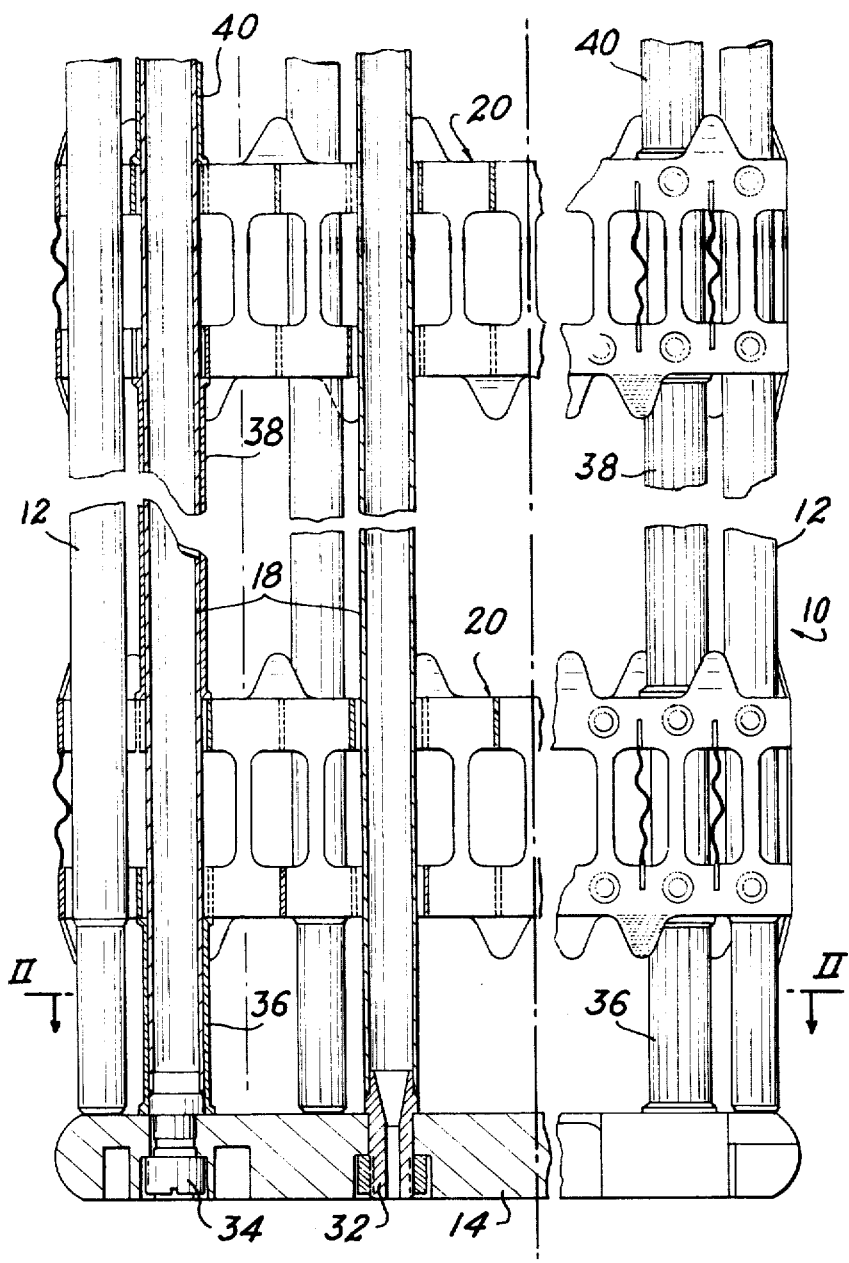

The sheaths of the slugs 12 (only some of which are shown in FIGS. 1a and 1b) are closed by end plugs 24, 26. The bottom plug 24 bears against the bottom plate 14. Between the top plug 26 and the top plate 16 the assembly is left a clearance $j$ enough not to be taken up during the total differential elongation of the canned slugs during operation. As a rule a clearance of the order of a few millimeters per meter of canned slug is left.

The three grids 20 shown by way of example are of the kind disclosed and claimed in French Pat. No. 1,584,335. Each of the grids comprises inside a frame a network of nested metal sheets bounding cells of square section. The metal sheets are hollowed out and each formed by two parallel rectilinear ribbons connected by narrow corrugated strips 30 forming a number of projections on each side of the plane of the two parallel ribbons (right-hand portion of FIGS. 1a and 1b). Slits interrupt one of the ribbons in the axis of each hollowed portion between two narrow strips so as to enable the perpendicular metal sheets to be nested in one another. The narrow corrugated strips are resiliently deformed by the slugs and tie-rods when the latter are in place and therefore exercise a frictional force thereon.

Figure 2:
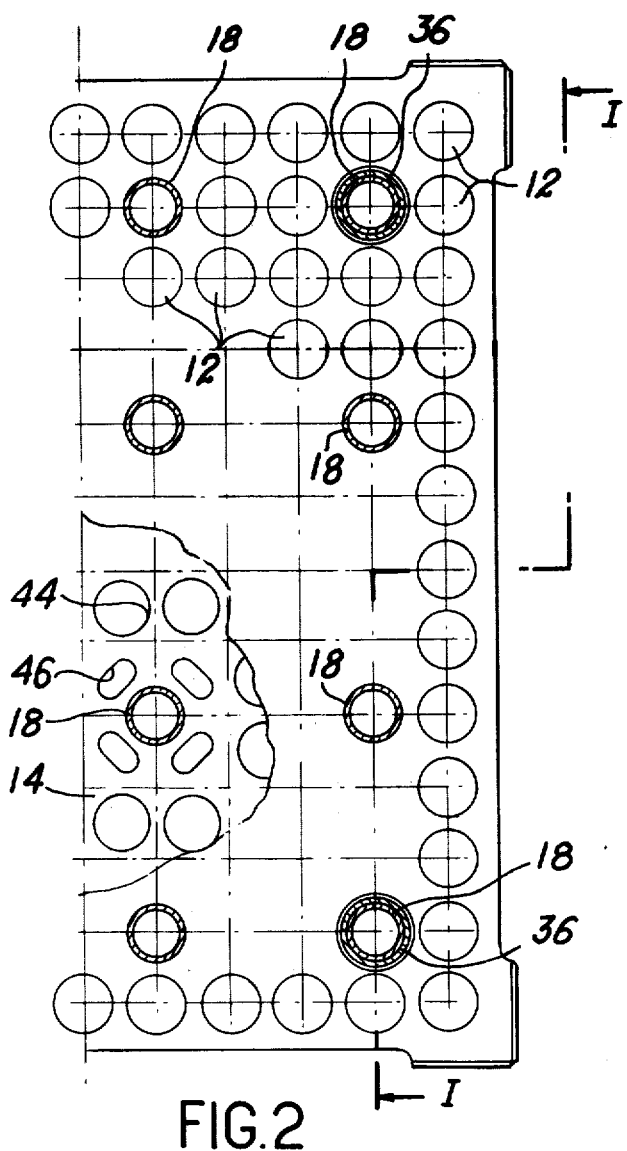
FIG. 2 is a partial sectional view, taken along the line II—II in FIG. 1b.

The tie-rods 18 for suspending the bottom plate 14 from the top plate 16 are in the embodiment illustrated formed by tubes adapted to allow the passage of mobile rods containing a neutron-absorbing material and forming part of the reactor control slugs. FIG. 2 shows that 16 regularly distributed locations forming part of 169 nodal points of the network bounded by the grids are occupied by tubular tie-rods 18. The bottom end of each of the tubular tie-rods has an attaching stud 32 (FIG. 1b) attached to the tube and formed with an axial passage through which coolant circulates. Each of the studs 32 comprises a shoulder bearing against the plate and a screwthreaded continuation receiving a securing nut 34. The top end of the tubular tie-rods is attached to the top plate 16, for instance, by crimping.

Figure 3:
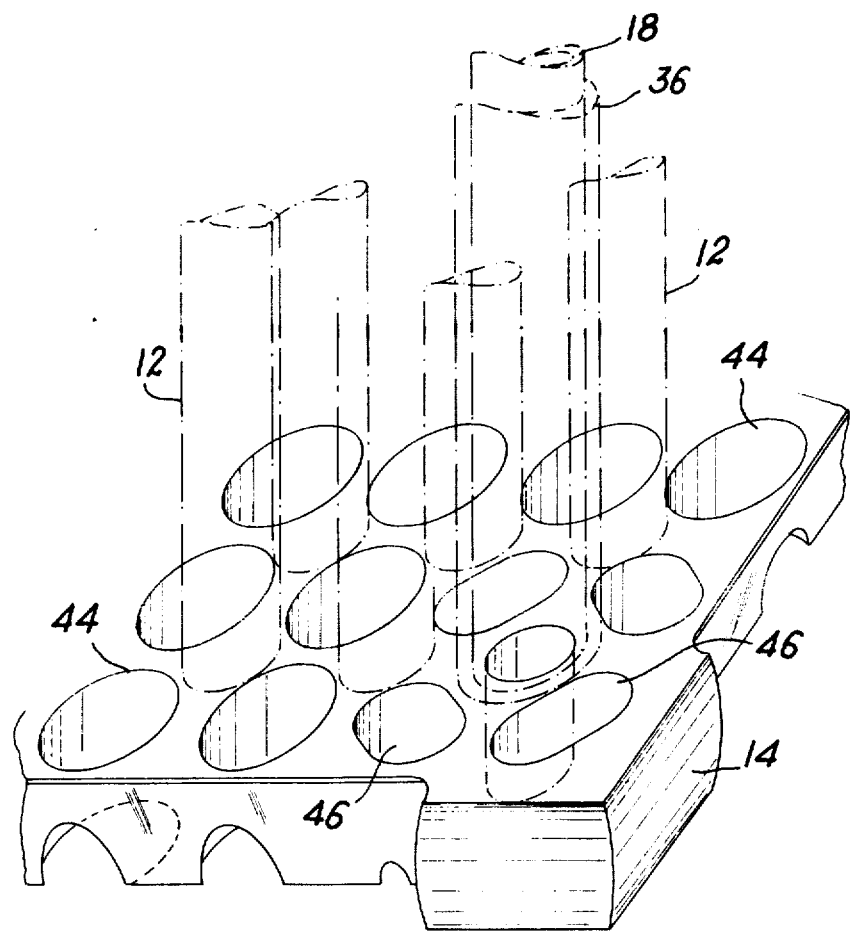
FIG. 3 is a diagrammatic perspective view of a portion of the bottom plate.

The plates 14, 16 are formed with orifices through which the coolant enters and leaves. The orifices in the plate 14 (FIGS. 2 and 3) comprise on the one hand circular holes 44 disposed in the centre of the meshes of the network of canned slugs and four holes of elongate shape 46 disposed around each tie-rod 18. The top plate 16 is formed with similar orifices.

The movement of the grids 20 along the tubular tie-rods 18 is bounded by stop members borne by the four corner tubular tie-rods, two of which are shown in FIG. 2. These stop members are formed by tubular struts 36, 38, 40 (FIG. 1b) and 42 (FIG. 1a). Each of the struts terminates in a radial flange adapted to bear against a grid or a plate. The total length of the struts 36, 38, 40 and 42 and the three grids 20 is less than the length separating the facing surfaces of the top and bottom plates 14, 16, so as to leave the necessary clearance for total differential elongation during operation.

The various members described hereinbefore are made of materials currently used in this kind of application. For instance, the sheaths, tubular tie-rods and struts are made of zirconium-based alloy or rust-resistant steel. In view of the resilience required from the components of the grids bearing against the sheaths and tubular tie-rods, the grids will as a rule be made of rust-resistant steel or a nickel/iron/chromium alloy, such as that known as "Inconel 718".

Clearly, the embodiment of the invention disclosed hereinbefore can be varied in very many ways. More particularly, the struts acting as stop members can be replaced by deformations of some of the tubular tie-rods 18 after the assembly thereof. The tubular tie-rods can be designed not to allow the passage of rods of neutron-absorbing material, but to contain a consumable neutron poison or some other filling material.

Moreover, it is quite clear that the term "canned slugs" should be taken to cover a stack of lozenges of oxide fuel (the general case) or carbide fuel, as well as a solid member.

We claim:

1. A nuclear fuel assembly having a cluster of elongated pins, and means for retaining said pins in parallel relation and in a regular array, said means comprising a top end plate, a bottom end plate supporting the fuel pins, spacing grids, said fuel pins passing through said spacing grids, tie-rods connecting said bottom plate to said top end plate and passing through said grids and said grids frictionally and resiliently engaging said fuel pins and said tie-rods for limited sliding movement of said grids on said tie-rods, stop members limiting the movements of the grids on and engaging the tie-rods, said stop members comprising tubular means slidably mounted on at least certain of the tie-rods and extending between the grids and a grid and plate and abutting against the grids and plates, the total length of the stop members and grids being less than the length separating the facing surfaces of the top and bottom plates to provide a clearance, said clearance being sufficient to allow for total differential elongation during operation.

2. An assembly as set forth in claim 1, wherein the tie-rods are tubular.

3. An assembly as set forth in claim 1, wherein the number of pins is about 10 times greater than the number of tie-rods.

* * * * *